Aug. 18, 1964     E. L. ANDERSON     3,144,956
CONTROL APPARATUS FOR DOORS
Filed Sept. 21, 1961                                                   5 Sheets-Sheet 1

INVENTOR.
EDGAR L. ANDERSON
BY
ATTORNEYS

Aug. 18, 1964  E. L. ANDERSON  3,144,956
CONTROL APPARATUS FOR DOORS
Filed Sept. 21, 1961  5 Sheets-Sheet 2

INVENTOR.
EDGAR L. ANDERSON
BY
ATTORNEYS

Aug. 18, 1964  E. L. ANDERSON  3,144,956
CONTROL APPARATUS FOR DOORS
Filed Sept. 21, 1961  5 Sheets-Sheet 4

INVENTOR.
EDGAR L. ANDERSON
BY
ATTORNEYS

United States Patent Office 3,144,956
Patented Aug. 18, 1964

3,144,956
CONTROL APPARATUS FOR DOORS
Edgar L. Anderson, Penfield, N.Y., assignor to Wilmot Castle Company, Rochester, N.Y., a corporation of New York
Filed Sept. 21, 1961, Ser. No. 139,674
22 Claims. (Cl. 220—55.3)

This invention relates to apparatus controlling the movement of doors and locking devices for doors and more particularly to apparatus of this nature adapted for use with pressure vessels and sterilizers.

In the past, doors adapted for use with sterilizers have been of a manual type. Manually operated sterilizer doors present certain inherent disadvantages in that the operator may, through inexperience and lack of understanding of the operation of the sterilizing apparatus, open the door at the improper time. While certain safety features have been provided for manually operated doors as safeguards against this possibility, completely automatic operation of the door is far superior to manual operation.

Therefore, it is one object of my invention to provide control apparatus for a door adapted for automation.

It is a further object of my invention to provide a fully automatic door control apparatus.

It is another object of my invention to provide certain safety features adapted for use with doors of any type preventing personal injury to the operator and self-inflicted damage of the door control apparatus.

To this end I have provided unique apparatus responsive to force opposing automatic movement of the door for stopping the door control apparatus.

Therefore, it is a significant object of my invention to provide apparatus, responsive to pressure opposing movement of the door in at least one direction, preventing further movements of the door in the direction of interference.

It is also an object of my invention to provide apparatus responsive to pressure opposing the movement of the locking elements of a door, preventing further movement of the door into an increasing interference position.

A further object of my invention is to provide means yieldingly moving or biasing the door and/or locking elements toward closure and means responsive to force opposing such yielding means to prevent further movement of the door and/or locking means toward closure. In addition, it is an object of this invention to provide means opposing said yielding means for selectively moving the door and/or locking elements between open and closed positions.

To the ends of the above objects, it is another object of my invention to provide both electrical and mechanical apparatus, responsive to pressure opposing movement of the door or locking means in at least one direction for disengaging the control mechanism controlling the door or locking mechanism.

Other objects and advantages of this invention will be particularly set forth in the claims and will be apparent from the following description, when taken in connection with the accompanying drawings, in which:

While for purposes of illustration I have chosen to describe my invention as applied to controls for a sterilizer door, it will be understood that there are many features of my invention which have general applications to doors for other apparatus where automatic opening, closing, sealing, locking and otherwise securing of doors and other closure members are desired, particularly for pressure chambers generally.

It will be understood that the term "control means" as used in the claims will be construed to mean whatever apparatus is necessary to fulfill the claimed function.

First, I shall briefly describe the illustrated embodiment of my invention. For closure of the sterilizer opening, there is a door hinged at the left side to the body of a sterilizer by several spaced eccentrically controlled hook-hinges. My invention includes apparatus for yieldingly biasing the door toward closure of the opening and for controlling the yielding apparatus in a manner selectively moving the door between an open and an ajar or substantially closed position.

Cooperating with these hook-hinges are a plurality of eccentrically controlled hook-locking means spaced around the entire periphery of the opening yieldingly biased toward an ajar or substantially closed position with the door when the door is in the ajar or substantially closed position.

Automatic controls rotate the hook-hinges and attached door arcuately to substantially the ajar or substantially closed position with the opening before the hook-locking means are rotated arcuately from an unlocked to an ajar position ready for locking the door to the sterilizer. Thereafter, the hook-hinges and hook-locking means are moved eccentrically in coordinated relation to a locked position in which the door is locked and sealed to the sterilizer.

Figure 1:
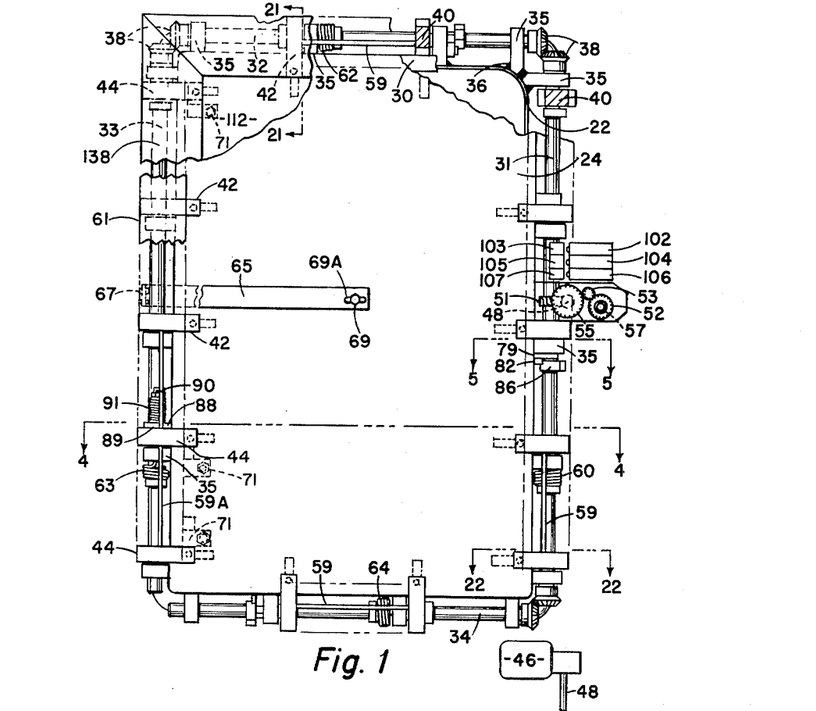
FIG. 1 is a front elevational view of one embodiment of my invention partly in section with parts broken away, illustrating the exterior face of the sterilizer door and adjacent apparatus controlling and locking the door.
Figures 2, 3:
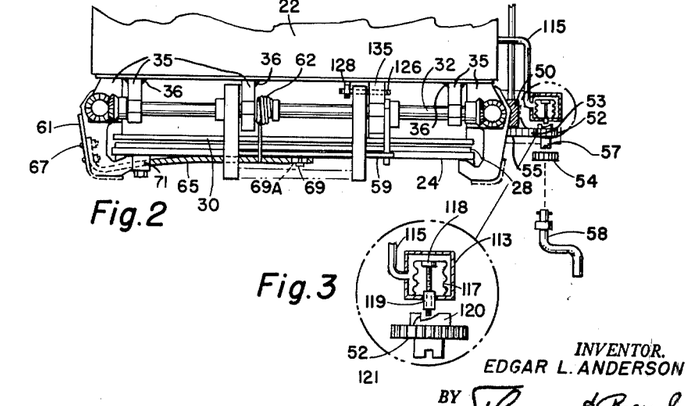
FIG. 2 is a top planar view of the embodiment illustrated in FIG. 1.
FIG. 3 is an enlarged view of the encircled portion of FIG. 2.

With reference to FIG. 1 and FIG. 2, I have illustrated a sterilizer or pressure vessel 22, referred to in the claims as a pressure vessel support member, with which a door member 24 is adapted for closure. The door 24 is provided with a circular cross-sectional resilient seal 26 (FIG. 4) extending around the periphery of the door intermediate two peripheral flanges 28, of door 24, defining a groove. The seal is adapted for closure against a peripheral flange 30 of the sterilizer 22.

The apparatus automatically opening, closing, sealing and locking the door with respect to the sterilizer includes a plurality of rotatable shafts 31, 32, 33 and 34, completely encircling the door 24 and extending lengthwise along the edges thereof. These shafts are mounted in suitably spaced bearings 35 rigidly mounted around the perimeter of the sterilizer, as for example by welds 36. The adjacent ends of the shafts 31–34, except at the lower left hand corner of the sterilizer as viewed in FIG. 1, are provided with meshing bevel gears 38 rigidly carried thereon to provide a continuous driving relationship between the shafts. It will be understood that meshing bevel gears could be provided at all four corners of the sterilizer. However, such an arrangement would require greater precision of the gears and would present the inherent handicap of gears possibly not meshing properly.

Figure 4:
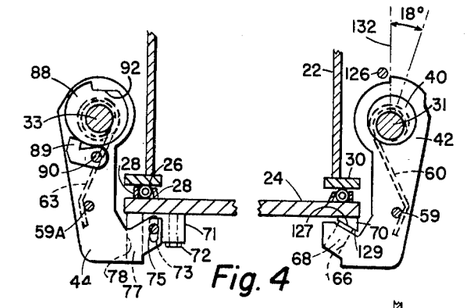
FIGS. 4, 6, 8, 10, 12 and 14 are sectional views of the door and associated parts in various positions during opening taken along the line 4—4 of FIG. 1 looking in the direction indicated by the arrows with parts broken away.

Each of the shafts 31–34 carries a plurality of eccentric cams 40 rigidly mounted thereon (FIG. 4). Each cam 40 has either a hook member 42 or hinge member 44 journalled thereon. Hook members 42 are sometimes referred to in the claims in a broader sense as "Locking Means" to more broadly define the scope of my invention. A cam 40 upon which a hinge 44 is mounted is shown in broken lines in FIG. 6. Although hook and hinge members 42 and 44 are substantially identical in design, I have distinguished hinge members 44 from hook members 42 by nomenclature and numerical designation for purposes of this description because the hinge members have the dual function of pivotally carrying the door 24, as well as locking the hinged side of the door to the sterilizer 22 in substantially the same manner as hooks 42 lock the other three sides. Only the top and lower two hooks on the left side of the door serve as hinge members 44; the remainder of the hooks on the hinge side of the door perform substantially the same function as hooks 42.

There is a plurality of blocks 45 (FIGS. 22 and 6) rigidly mounted around the periphery of door 24 aligned with each hook 42 for a purpose described below.

Automatic rotational movement of eccentric cams 40 is provided by a commercially available three wire reversible motor 46. Motor 46 drives a shaft 48 rigidly carrying a worm 50 meshing with and driving a worm gear 51 rigidly mounted on shaft 31.

The motor 46, being driven at a speed of approximately 60 r.p.m., drives shafts 31–34 at a speed of approximately 3 r.p.m. This speed reduction is accomplished through the worm 50 and worm gear 51.

As illustrated in FIGS. 1 and 2, I have also provided manually controllable gears 52, 53 and 55, the latter of which is rigidly mounted on shaft 48 at the end opposite motor 46. Gear 53 is merely an intermediate idler gear. Gear 52 is provided with a slot 57 adapted for receiving a manually controllable crank 58 in driving relationship. I have provided a removable cap or cover 54 adapted to cover slot 57 during automatic operation. This cap prevents garments of the operator from getting caught and twisted by the slot 57. Also, the rotation of the cap during operation is a visual aid to the operator.

Rods 59 interconnect all hooks 42 along each of the shafts 31, 32 and 34. However, for simplicity and clarity of the drawings, I have shown rods 59 as interconnecting only the lower two hooks along shaft 31.

At 59A, I have provided a rod interconnecting the two hooks 42 and three hinges 44 carried by shaft 33. Again, for purposes of simplifying the drawings, rod 59A is only shown between the bottom two hinges and the next above hook. A rigid plate 61 interconnects only the hinges 44 carried by shaft 33.

Plate 61 furnishes rigid support for a yielding spring member 65 rigidly connected at its left end to plate 61 by bolts 67. Spring 65 is slidably mounted at its right end on a bolt 69 attached to door 24. Bolt 69 traverses a slot 69A in spring 65. Spring 65 cooperative with a sliding hinge arrangement between the hinge members 44 and door as described in detail below biases the right hand side of the door toward closure when the door is being either opened or closed and biases the left hand side of the door open when the door is being opened, thereby providing a dual purpose. First, when the door is being opened or closed, the spring 65 assures that the right hand side of the door is in closed relation with the sterilizer before arcuate movement of hooks 42 selectively between the locked and ajar positions or vice versa. Secondly, when the door is being opened, the left side is insured of being opened, in case of reduced pressure in the sterilizer or sticking of the seal, before the hooks 42 are moved arcuately from ajar to unlocked positions, thereby preventing an explosive opening of the door 24 after the hooks 42 are free of the door. It will be understood that a door cover 112 and deflectors 138 covering the hooks and hinges (see FIG. 21) will not interfere with this function.

One additional function of spring 65, responsive to the hinges 44 and plate 61 being moved counter-clockwise to the position of FIG. 2, is to force the left side of the door sufficiently close to the closed position with flange 30 to permit the hooks 42 carried by shaft 32 to be moved from the unlocked position to the ajar position without interference with the door.

Hooks 42 have threaded bores 66 (FIG. 4) receiving adjustable threaded screws 68 adapted to frictionally bear on the exteriorly disposed inclined faces of locking pads 70 rigidly welded to door 24. Blocks 45 and pads 70 (FIG. 6) define notches for receiving hooks 42 in wedged relationship.

The left hand side of the door is provided with three hinge blocks 71 (FIG. 4) rigidly mounted thereto, for example by bolts 72. Each block 71 has an elongated slot 73 extending normal to the door 24 for receiving a pin 75 rigidly mounted to each hinge member 44. Pin 75 is slidable within slot 73 and provides a secondary hinge cooperating with spring 65 to permit the left hand side of the door to be opened before the right hand side of the door is opened. Adjustable screw members 77 are received internally of threaded bores 78, provided in hinge members 44, it being understood that screw members 77 are adjusted as illustrated in FIG. 4 to abut door 24 when in the locked and closed position.

Torsion springs 60, 62, 63 and 64, rigidly mounted respectively to shafts 31–34 inclusive, are provided to bear against rods 59 and 59A thereby biasing hooks 42 and hinge members 44 from open toward the ajar position, as illustrated in FIGS. 1, 2 and 4. In FIG. 4, I have shown torsion springs 60 and 63 in broken line. This particular arrangement of springs provides a very important safety feature to be explained hereinafter. I shall now, for simplification of the description, describe, with reference only to the right side of the door, as viewed in FIG. 1, the automatically actuated control mechanism, by which all of the hooks 42 around the non-hinge sides of the door are controlled in opposition to the torsion springs 60, 62, and 64.

Figure 5:
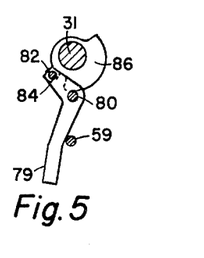
FIGS. 5, 7, 9, 11, 13 and 15 are sectional views taken along the line 5—5 of FIG. 1 looking in the direction indicated by the arrows, illustrating various positions of parts of this embodiment corresponding respectively to the positions of the door appearing at the left of these figures and numerically preceding these figures by one numeral.

In FIG. 5, I have illustrated the automatically actuated control mechanism for maintaining these hooks in what shall, for purposes of this application, be referred to as a normal position during the opening and closing of the door. The rod 59, against which torsion spring 60 bears, as illustrated in FIG. 4, is shown again in section at FIG. 5. Selectively opposing the biasing action of spring 60 is an angular lever 79 pivotally mounted on one of the bearings 35 (FIG. 1). For maintaining the hooks in their normal position, lever 79 carries a follower roller 82 pivotally mounted on a depending pin 84. The action of lever 79 is controlled by a cam 86 rigidly mounted on shaft 31 engaging follower rollers 82.

From the above described portions of this embodiment, it will be understood that the combination of the lever 79 permitting the spring 60 to close the hooks 42 and the hooks being journalled onto cams 40 provides automatically actuated hooks which will yield to force, sufficient to overcome the bias effect of torsion spring 60. Thus, no self-inflicted damage of the apparatus can result from interfering parts and no bodily injury can be occasioned by human limbs accidentally getting between the hooks and other parts. This same apparatus is provided for controlling hooks carried by shafts 32 and 34.

Lever 79 may be resilient, so long as it provides sufficient force to overcome the force of torsion spring 60. In this manner, the hooks are rendered yieldable in either direction of rotation on shafts 31–34.

There are numerous ways in which the yielding hook arrangement could be provided such as a detent between the cam and the hook or in the manner in which the hinges 44 and hooks 42 of the hinged side of the door are actuated, as described below. All such possibilities are within the scope of my invention.

The automatically actuated control mechanism for hinges 44 and hooks 42, of the left or hinged side of the door, comprises a catch member 88 rigidly mounted to rotate with shaft 33 and a latch 89 pivotally mounted to a pin 90 carried by member 44. A torsion spring 91 (FIG. 1) is rigidly attached at one end of pin 90 and at its other end to latch 89 tending to maintain the latch in an engaged position with rotatable catch member 88. Thus, as the catch member 88 is rotated clockwise, as viewed in FIG. 10, by shaft 33, an indenture or notch 92 of catch 88 receives a mating portion of latch 89 in proper timed relationship with the other automatically controlled portions of my invention, for pivoting the hinges 44 and hooks 42 on the hinged side of the door, in opposition to spring 63 to the ultimate "open" position illustrated in FIG. 14.

It will be understood from the above description of the function of spring 65, biasing the left side of the door open to prevent an explosive opening, that this function also has the purpose of opening the door in advance of preventing the catch 88 and latch 89 from becoming disengaged, which would otherwise occur as a result of a vacuum in the chamber of the sterilizer 22 sufficient to overcome the force of torsion spring 91.

Figure 10:
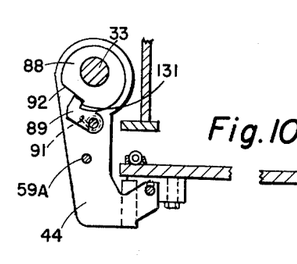
Figure 14:
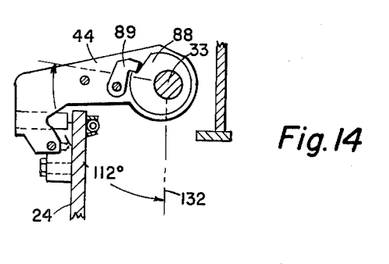

From the above description, it is clear that during the closing cycle, hinges 44 and hooks 42 on the hinged side of the door yieldingly move the door 24 arcuately from the position shown in FIG. 14 to the position shown in FIG. 10. Thereafter, the hooks 42 surrounding the other three sides of the door are moved arcuately from the position in FIG. 10 to the position of FIG. 8. Then the eccentric cams 40 move all hinges 44 and hooks 42 radially with respect to the shafts 31–34 from the position in FIG. 8 to that of FIG. 4, thereby bringing the door 24 into secure locking relationship with the sterilizer 22.

Figure 20:
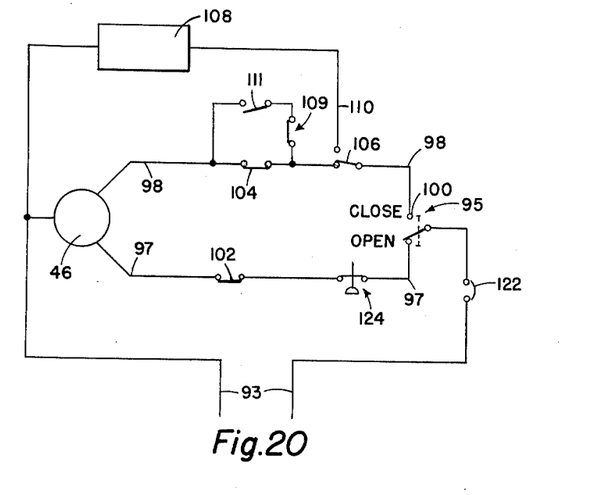
FIG. 20 is a schematic drawing of the electrical circuitry of this embodiment of my invention.

With reference to FIG. 20, I shall now describe the electrical circuitry by which automation is accomplished. Terminal connections 93 of the circuit are across a 115 volt alternating current line. At 46, I have illustrated the motor across the line. A manually controlled switch 95 selectively completes a circuit through a line 97 to the motor 46 for opening the door and through a line 98 to the motor 46 for closing the door. I have illustrated control switch 95 in the "open" position completing the circuit through line 97 to the motor.

When switch 95 is manually actuated to make contact with line 98, the circuit is completed to drive the motor in the direction closing the sterilizer door 24 if certain control switches described below complete the circuit.

Three cam-controlled-normally-closed switches 102, 104 and 106 control automation of the door. These switches are schematically illustrated in FIGS. 16–19 inclusive. Cams 103, 105 and 107 for controlling these switches are shown in various positions in these same figures. Switches 102, 104 and 106 are mounted on sterilizer 22 as illustrated in FIG. 1. Cams 103, 105 and 107, respectively controlling switches 102, 104 and 106, are rigidly mounted on shaft 31 in the manner illustrated in FIGS. 1 and 16–19. Shaft 31 rotates these cams in a counter-clockwise direction when the motor is being operated across line 97 to open the door and in a clockwise direction when motor is across the line 98 to close the door as designated by the arrows of FIG. 16 at cam 107. Switch 102, in circuit with line 97, is actuated by cam 103, as illustrated in FIG. 19, at the end of the opening cycle for stopping the door at the position of FIG. 14.

At 108, I have illustrated the automatic controls for the sterilizing cycle. Before switch 95 is manually changed to the "close" cycle, the operator simply pushes buttons (not shown) associated with controls 108 and sets a timer for the desired period of sterilization. When the motor is in circuit with the line 98, normally closed switch 106 is actuated at the end of the "close" cycle to break the circuit through line 98 and make the circuit to the sterilizer controls 108 through a line 110. Thus, the sterilizing cycle, controlled by the circuitry at 108, commences upon closure and locking of the door. In turn, the motor 46 is stopped and shaft 31 thereby maintains cam 107 in a position holding switch 106 in circuit with line 110 through the entire sterilizing cycle.

Figure 8:
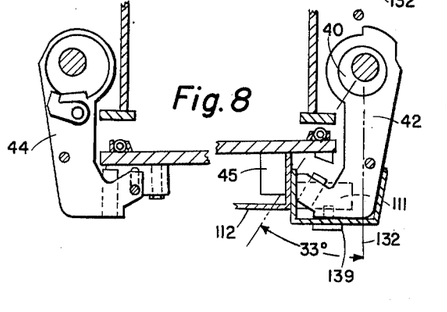

The circuitry includes a normally-open switch 111, in parallel circuitry with switch 104 mounted on one of the hooks 42 of shaft 31, as illustrated in FIG. 8. Switch 111 closes to complete the circuit to motor 46 only when contact is made with a door cover 112 detachably mounted to the plurality of blocks 45. Also, I have provided a manually controlled normally closed switch 109 in series with switch 111 for a purpose to be described hereinafter.

Assuming that the hooks and hinges are maintained in their "normal" position without interference, the cam 105 is positioned on shaft 31 in a manner permitting normally-closed switch 104 to remain closed until normally-open switch 111 has been closed by engagement with the door cover 112. FIG. 8 shows the position of switch 111 making contact with door cover 112 momentarily before cam 105 reaches the position shown in FIG. 17 for opening switch 104.

One of the safety features of my invention, to be described hereinafter, is accomplished by cam 105 opening switch 104 to stop the motor 46 when interference occurs preventing switch 111 from engaging door cover 112 before cam 105 opens switch 104.

I shall now describe the various safety features of my invention. With reference to FIGS. 2 and 3, I have provided an enclosed chamber 113 exposed through a conduit 115 to the chamber of the sterilizer 22. A bellows 117, mounted inside of chamber 113, responsive to the steam pressure of the sterilizer, controls a threaded pin or stop member 118 carrying an elongated bar 119 keyed in sliding relationship with chamber 113. Upon increase of pressure in the chamber of the sterilizer 22 to a preselected level, bar 119 is received in a notch 121 of a catch 120 rigidly mounted to rotate with gear 52, thereby providing a ratchet device preventing shaft 48 from turning when selected pressure level is reached. This stalls the motor and actuates a circuit breaker 122 (FIG. 20) to open the circuit to the motor 46. This apparatus will also prevent anyone from manually opening the door by use of the crank 58 (FIG. 2). The threads on pin 118 permit adjustment of bar 119 to provide the selection of the pressure level at which the motor will be stalled by this ratchet.

As an additional safety feature, I have provided a pressure switch 124 (FIG. 20) exposed to the pressure in the sterilizer chamber in circuit with line 97 preventing the motor 46 from operating if the chamber is above a preselected pressure level.

Another safety feature of this invention is the friction transmitted between the largest radial portion of eccentric cam 40 and hook 42, in the locked position shown in FIG. 4, when the sterilizer chamber is at elevated pressures. This friction is sufficient to stall motor 46 and actuate circuit breaker 122 to open the circuit if any attempts are made to open the door while a selected pressure level exists in the chamber.

Figure 21:
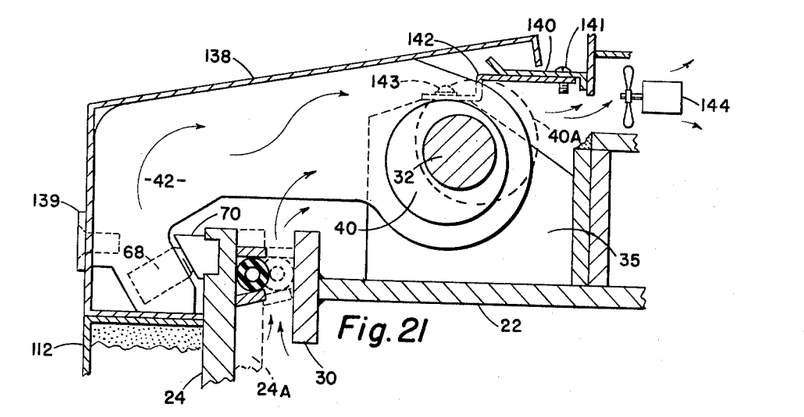
FIG. 21 is an enlarged sectional view taken along the line 21—21 of FIG. 1 looking in the direction of the arrows.
Figures 22, 23:
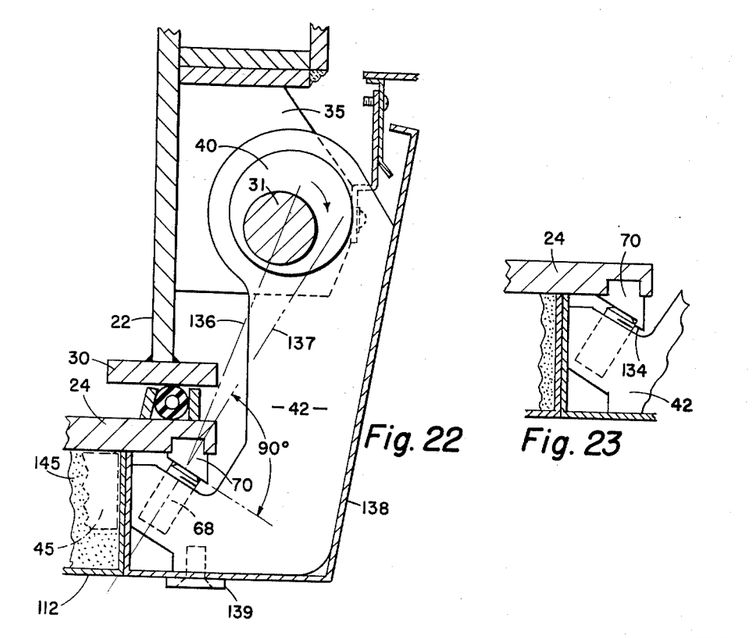
FIG. 22 is an enlarged sectional view taken along the line 22—22 of FIG. 1 looking in the direction of the arrows.
FIG. 23 illustrates a second embodiment of the locking arrangement shown in FIG. 22.

A further safety feature of my invention is the combination of the interiorly disposed inclined surface 127 (FIG. 4) provided by the adjustable screws 68 of hooks 42 and the mating exteriorly disposed inclined surface 129 of the locking pads 70 against which screws 68 bear in the locked position. With reference to FIG. 22, an imaginary line 136 extends from the center of the bearing surface of screw 68 and pad 70 through the center axis of shaft 31 and the largest radius of the eccentric cam 40 when disposed on the opposite side of shaft 31 from screw 68, thereby providing maximum locking force between the locking elements 68 and 70. It will be observed that the central axis 137 of screw 68, which is normal to the inclined bearing surfaces 127, and 129 is beyond the center axis of shaft 31. This is to insure that the hooks 42 cannot be moved arcuately away from the locked position without first being moved to the ajar position and to increase the wedging action of the hooks 42 between pads 70 and blocks 45. The locked position is again illustrated in broken lines in FIG. 21 where respective parts are designated by the numeral followed with the suffix "A." If there is not sufficient pressure in the sterilizer chamber to prevent the previously described safety devices from preventing the hooks 42 from moving to the ajar position, then any pressure in the sterilizer 22, sufficient to overcome the force of spring 65 (FIG. 1), will maintain the pad 70 in an engaged position with screw 68, as viewed in solid lines in FIG. 21. The selected angle of the bearing surfaces of these locking elements 68 and 70, described above with relation to line 137, increases the security of the screws against the pads 70. This arrangement prevents the locking hooks 42 from rotating away from the door until the sterilizer 22 is vented of all pressure. Once the sterilizer 22 is vented, the force of spring 65 will be sufficient to bias the right side of the door toward closure and lever 79 will rotate the hooks free of the inclined pads 70.

In FIG. 23, a preferred embodiment of the inclined pad 70 is shown, with an abutment 134. Abutment 134 cooperates to insure that the hooks will not be rotated free of the door until all pressure is vented from the sterilizer 22.

A very important feature of this invention is the deflection of any steam pressure away from the operator while the door is in the ajar position. As best illustrated in FIG. 21, a plurality of deflectors 138 extending the full length of each side of the sterilizer door 24 (see also FIG. 1) are rigidly mounted to the hooks by screws 139. Because of the angular movement of hooks 42 it is necessary to furnish a plurality of secondary deflectors 140 intermediate the hooks 42 and deflectors 138. Secondary deflectors 140 are mounted at 141 to supports 142 in turn fastened at 143 to bearings 35.

It will be understood that these deflectors direct any steam away from where the operator would be standing. A fan 144 may be provided to facilitate venting of steam or air pressure.

The deflectors in combination with the fan have a supplementary and important feature. During sterilization, the fan withdraws radiant heat from around the periphery of the door. The problem of radiant heat from sterilizers is becoming an increasingly important problem because of air conditioning in hospitals. The door cover 112 is provided with substantial insulation 145 (FIG. 22).

An additional safety factor of the deflectors 138 is the fact that they are designed to mate with the entire periphery of door cover 112 when all hooks are in locked position (FIG. 1). Therefore, the operator can see at a glance whether all of the hooks are closed and locked.

Perhaps the most important safety feature of my invention is to prevent the possibility of personal injury to the operator as the result of limbs accidentally getting between the hooks and the door or damage from an object being placed intermediate the hooks 42 and the door 24. I have provided two safety devices to this end for stopping movement of the drive shafts 31–34 if the interfering human limb or object is not withdrawn before the drive shafts and cams reach a selected position. This position is reached before any possible injury or self-inflicted damage can occur.

The basis of both safety devices depends upon the resilient mounting of the hooks 42 with relationship to the driving shafts 31–34 inclusive, whereby a hand or other object inserted intermediate the hooks and the door will force the hooks out of the normal position, in which they are yieldably maintained by torsion springs 60.

The first of these two safety devices includes a pin 126 (FIGS. 2 and 6) rigidly mounted at one end to one of the bearings 35 and at the other end in a support 128, in turn rigidly connected to the sterilizer 22 as illustrated in FIG. 2. At least one hook 42 on each non-hinged side has a cam projection 130 adapted to engage a pin 126 when a hook 42 is actuated out of its normal position by some interfering object. It will be understood that, because of the interconnection of the hooks 42 by pins 59, it is only necessary to provide one pin 126 for each side of the door and a corresponding projection 130 on only one of the hooks 42.

It will be understood that the projection 130 is designed in contour such that it does not engage pin 126 so long as the hooks 42 are in their normal position during the opening or closing cycle.

Figure 6:
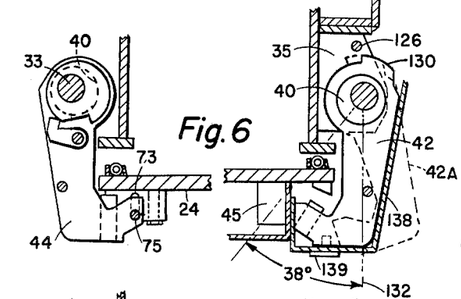

In FIG. 6 I have shown, in solid lines, the hook 42 at its normal position when the other parts of the apparatus are at the illustrated position. In broken line at 42A, I have illustrated the hook at a position to which it might be forced by an interfering object. Thus, it will be noted that the projection 130 is brought in line with pin 126. If the hand or other article creating the interference is not removed from the interfering position, the eccentric cam 40, rotating in a clockwise direction for closure, will move the projection 130 into engagement with pin 126. Thereafter, the wedging action of the largest radial portion of the eccentric cam 40 forcing projection 130 into increasing frictional engagement with pin 126 creates sufficient friction between cam 40 and hook 42 to stall the motor 46 and actuate the circuit breaker 122 to deactuate the motor 46, thereby stopping the drive shafts 31–34. If the apparatus is being operated by manual control, the operator will be prevented from turning the crank 58 (FIG. 1) any further in a closure rotational direction.

The second safety device includes electrical circuitry and therefore is only effective during automatic operation. This safety device comprises normally closed switch 104 and normally open switch 111 carried by a hook 42. At the commencement of the closing cycle when the switch 95 makes contact with line 98, the illustrated parts are in the positions respectively illustrated in FIGS. 14, 15 and 19. At the commencement of the closing cycle, switch 104 is in its normally closed position completing the circuit through line 98 and switch 111 is in its normally open position. The switches remain in these positions until the cam 105 reaches the position illustrated in FIG. 18 and the hooks 42 and switch 111 arrive at the corresponding position illustrated in FIG. 8. In this position switch 111 has engaged the door cover 112 thereby closing the normally open switch 111 before cam 105 has opened switch 104. Instantaneously thereafter, switch 104 is opened by the cam 105 as seen from FIG. 17. Hence, if interference prevents switch 111 from engaging door cover 112 before cam 105 reaches the position shown in FIG. 17, the motor 46 and shafts 31–34 stop.

A very important mechanical safety feature was provided for the opening cycle to prevent damage to the apparatus as a result of some object coming into an interfering position with the exterior face of either door 24 or door cover 112 opposing opening thereof. This end has been accomplished by providing a detent between the hinges 44 and catch member 88 controlling the movement of the hinges. This detent comprises latch 89 and notch 92 of catch 88, as indicated in FIG. 10 at 131, and the torsion spring 91. When force opposing opening of the door occurs, inclined surfaces at 131 permit the latch 89 to release the rotatable catch member 88 in opposition to torsion spring 91 (FIG. 1). The catch 88 continues to rotate with the shaft 33 free of any driving connection with the hinge member 44.

I shall now describe in detail the operation of my invention in light of the above description. I shall describe the opening cycle commencing with the extreme closed position of FIGS. 4 and 5 and terminating with the extreme open position of FIGS. 14 and 15, with all intermediary numbered drawings representing selected positions of the mechanical structure between open and closed positions.

Figures 16, 17:
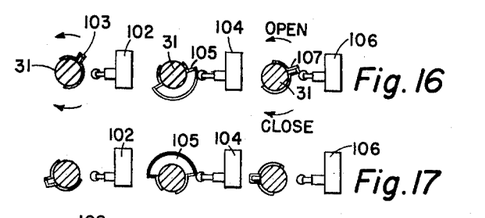
FIG. 16 illustrates positions of control cams of this embodiment corresponding to the position of other parts illustrated in FIGS. 4 and 5.
FIG. 17 illustrates positions of the control cams of FIG. 16 corresponding to the position of other parts illustrated in FIGS. 6 and 7.

In the extreme closed position illustrated in FIG. 4, the largest radius of eccentric cam 40 extends at an angle in the first quadrant of approximately 18° with a plane 132 which is normal to the door 24. At this position, maximum locking force is transmitted through adjustable screw 68 to the pad 70. The operator throws switch 95 to the position shown in FIG. 20 completing the circuit through line 97 to the motor 46. As shown in FIGS. 16 and 20, switch 102 is in its normally closed position with cam 103 being rotated, in a counter-clockwise direction, away from switch 102. The cams 40 move the hooks 42 and hinges 44 from a locked position of FIG. 4 to an ajar position of FIG. 8, where the largest radius of eccentric cam 40 extends at an angle in the second quadrant of approximately 33° with the plane 132.

It will be noted from FIGS. 6 and 8 that, as the hinge 44 is moved from the position illustrated in FIG. 4 to that illustrated in FIGS. 6 and 8, the pin 75 carried by hinge member 44 slides backwardly in the slot 73 of block 71 so that the door 24 is free to pivot slightly in response to the spring 65 for retracting the left side of the door in advance of the right side of the door for the purposes above described.

Figure 9:
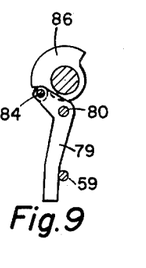

As illustrated in FIG. 9, the follower roller 84 has started up the raised portion of cam 86. The raised portion of this cam turns lever 79 in a counter-clockwise direction, about pivot rod 80, to the position shown in FIG. 11, thereby pivoting the hooks 42, interconnected by rod 59, to an unlocked position illustrated in FIG. 10 where the largest radius of the eccentric cam 40 extends at an angle of approximately 12° with plane 132 in the fourth quadrant. When the hooks are in this unlocked position, the door is free to be pivoted on hinges 44 to an open position. Throughout the remainder of the opening cycle, cam 86 maintains hooks 42 in this unlocked position.

Figure 12:
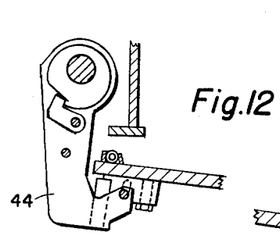
Figure 13:
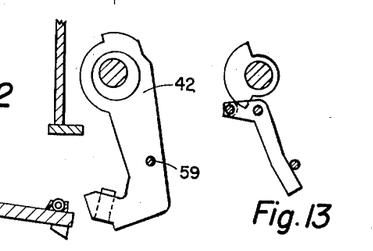

When the hinge members 44 have reached the position illustrated in FIG. 10, the notch 92 of catch member 88, being rotated in a clockwise direction, picks up the latch 89 and rotates the hinge members 44 in a clockwise direction successively to the positions of FIGS. 12 and 14.

Figure 15:
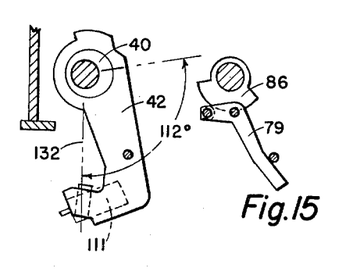

When the described parts have reached the position illustrated in FIGS. 14 and 15, the cam 103 has reached the position of FIG. 19 for engaging and opening normally closed switch 102 and breaking the circuit to motor 46 to stop the door.

I shall now describe the operation of the apparatus and circuitry during the closing cycle. Switch 95 is manually changed so that switch 95 completes the circuit through line 98 to the motor 46. Switches 104 and 106 are in their normally closed positions illustrated in FIG. 20 supplying current through line 98 to the motor 46 and switch 111 is in its normally open position.

In the extreme open position illustrated in FIG. 14, the largest radius of eccentric cams 40 is angularly displaced from plane 132 by an angle of 112°. Closure of the door 24 follows the same sequence of drawings described above for the opening cycle but in reverse order commencing with FIG. 14 through and including FIG. 4 and FIG. 19 back to FIG. 16

Commencing with FIG. 14, the hooks 42 are maintained in the retracted unlocked position by the lever 79 while the catch member 88, now rotating in a counter-clockwise direction, permits the torsion spring 63 (FIG. 4) to swing the hinge members 44 and door 24 in a counter-clockwise direction to the ajar position of FIG. 10. Thus, the door is permitted to close before the hooks 42 of the non-hinged sides of the door move to the ajar position.

Figure 11:
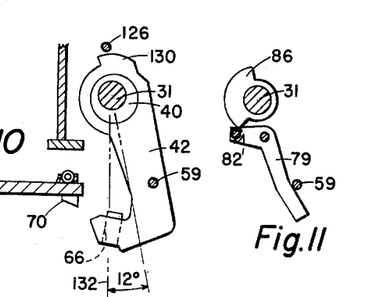

It will be noted from FIG. 11 that the following roller 82 of lever 79 is just ready to drop from the raised portion of cam 86 to its position in FIG. 9, at which position the torsion spring 60 (FIG. 4) biases the hooks 42 in a clockwise direction to the ajar position of FIG. 8.

Figure 7:
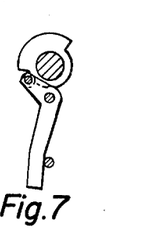
Figure 18:
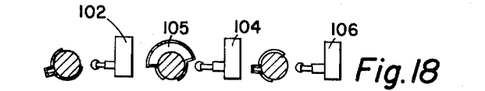
FIG. 18 illustrates positions of the control cams of FIG. 16 corresponding to the position of other parts illustrated in FIGS. 8 and 9.
Figure 19:
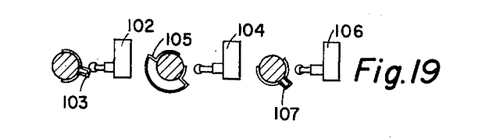
FIG. 19 illustrates positions of the control cams of FIG. 16 corresponding to the position of other parts illustrated in FIGS. 14 and 15.

When the hook 42 has arrived at the position shown in FIG. 8, switch 111 has engaged door cover 112, to close normally open switch 111, at a time when cam 105 is in the position of FIG. 18. Thereafter, cam 105 is rotated clockwise to the position of FIG. 17 corresponding to FIGS. 6 and 7 where cam 105 opens switch 104.

Thus, if no interference has occurred, the circuit to the motor 46 through line 98 continues to operate the motor during closure. If interference has occurred intermediate the hooks 42 and the door, normally open switch 111 does not close and the switch 104 breaks the circuit to the motor.

Assuming no interference, the eccentric cams 40 will move the hooks 42 and hinges 44 from ajar positions of FIG. 8 to locked position of FIG. 4, where sealing and locking force is applied through the adjustable screws 68 to the pads 70 on all sides and through the adjustable screw 77 of the hinge members 44 to the door. When the motor has carried the shafts 31–34 inclusive to this position, the cam 107 engages a switch 106, as illustrated in FIG. 16, to break the circuit to the motor and close the circuit through line 110 to the electrical controls 108 for the sterilizing cycle and sterilization commences.

With the speed of the shafts 31–34 inclusive being 3 r.p.m., it takes approximately 16 seconds to fully open or close and seal the door.

The manually controlled normally closed switch 109 in combination with the cam controls for normally closed switch 104 provide means for stopping the apparatus at the ajar position. In the sterilizer trade, it is desirable to provide a door which may be left ajar when not in use. It will be understood from the above description that if the operator manually opens switch 109, cam 105 will open switch 104 and stop all moving parts in the ajar position of FIGS. 6 and 7.

Obviously, means for slidably supporting the door with relationship to the sterilizer could be provided in combination with locking hooks 42 surrounding the entire periphery of the door in lieu of hinges 44.

While I have shown and described the preferred form of mechanism of my invention it is apparent from the last paragraph that various modifications and changes may be made therein, particularly in the form and relation of parts, without departing from the spirit of my invention as set forth in the appended claims.

I claim:

1. Improved apparatus for combination with a pressure vessel member having an opening and a door member for closure of said opening, said improvement comprising pivotal hinge means intermediate said members at a first side of said door member, first control means selectively moving said door member between an open position and a closed position relative to said opening, means responsive to force opposing said control means for disengaging said control means, locking means movably mounted on a first of said members at a second side of said door member being adapted to engage a second of said members when said members are in substantially said closed position, second control means coactive with said first control means selectively moving said locking means between an unlocked position and a locked position and means responsive to force opposing said second control means for disengaging said second control means.

2. Improved apparatus for combination with a vessel member having an opening and a door member for closure of said opening, said improvement comprising pivotal hinge means intermediate said members at a first side of said door member, first control means selectively moving said door member between an open position and a closed position relative to said opening, locking means movably mounted on a first of said members at a second side of said door member for locking said members together, yielding means biasing said locking means toward a locked position with a second of said members and second control means coactive with said first control means selectively opposing said yielding means for selectively moving said locking means toward and away from said locked position and maintaining said locking means in a normal position.

3. Apparatus in accordance with claim 2 in which said first and second control means are coactive to close a second door side before said locking means is moved toward said locked position.

4. Apparatus in accordance with claim 2 including means responsive to interfering force moving said locking means away from its normal position in opposition to said yielding means for stopping said second control means.

5. Improved apparatus for combination with a pressure vessel member having an opening and a door member for closure of said opening, said improvement comprising means supporting said door member in substantially a closed position in relationship to said opening, locking means movably mounted on a first of said members and adapted to engage a second of said members for locking said members together when in substantially said closed position, control means selectively moving said locking means between an unlocked and a locked position and means responsive to force opposing said control means for disengaging said control means.

6. Improved apparatus for combination with a pressure vessel member having an opening and a door member for closure of said opening, said improvement comprising means supporting said door member in substantially a closed position in relation to said opening, locking means movably mounted on a first of said members and adapted to engage a second of said members for locking said members together when in substantially said closed position, control means selectively moving said locking means toward and away from said locked position and means responsive to force opposing said control means for preventing further movement of said locking means by said control means.

7. Improved apparatus for combination with a pressure vessel member having an opening and a door member for closure of said opening, said improvement comprising pivotal hinge means intermediate said members at a first side of said door member, control means selectively moving said door member yieldingly toward and non-yieldingly away from a closed position with said opening, and means responsive to force opposing said control means for disengaging said control means.

8. Improved apparatus for combination with a pressure vessel member having an opening and a door member for closure of said opening, said improvement comprising yielding means biasing said door member toward an open position with said opening and control means non-yieldingly and selectively opposing said yielding means for selectively moving said door member between said open and closed positions and for maintaining said door member in a normal position.

9. Improved apparatus for combination with a pressure vessel member having an opening and a door member for closure of said opening, said improvement comprising means supporting said door member in substantially a closed position in relationship to said opening, a plurality of locking elements rotatably mounted on a first of said members along at least one side of said door member and being coactive with a second of said members for locking said door member in closure relationship to said opening, yielding means biasing said locking elements toward a locked position with said second member, control means selectively opposing said yielding means for selectively rotating said locking elements toward and away from said locked position and maintaining said locking elements in a normal position, and means intermediate said door and door support members at a second side of said door opposite said first side coactive with said locking elements to lock said door member in said locked position, and means responsive to force opposing movement of said locking means for stopping said control means.

10. Apparatus in accordance with claim 9 in which said locking means comprise hooks.

11. Improved apparatus for combination with a pressure vessel member having an opening and a door member for closure of said opening, said improvement comprising: pivotal hinge means intermediate said members at a first side of said door member, control means selectively moving said door member yieldingly toward and non-yieldingly away from a closed position with said opening, detent means interposed between said hinge and control means for disengaging said control means responsive to force opposing opening of said door member.

12. Apparatus in accordance with claim 5 in which said control means includes means for yieldingly moving said locking means toward a selected one of said positions.

13. Improved apparatus for combination with a pressure vessel member having an opening and a door member for closure of said opening, said improvement comprising pivotal hinge means intermediate said members at a first side of said door member, control means selectively moving said door member yieldingly toward and non-yieldingly away from a closed position with said opening, and means responsive to force opposing movement of said door for preventing movement of the door by said control means at least while being opposed.

14. Improved apparatus for combination with a pressure vessel member having an opening and a door member for closure of said opening, said improvement comprising: a shaft rotatably mounted on said pressure vessel member at a first side of said door member, said door being rotatably hinged to said shaft, yielding control means movable with said shaft for yieldingly controlling the rotation of said door about said shaft between open and substantially closed positions.

15. Improved apparatus for combination with a pressure vessel member having an opening and a door member for closure of said opening, said improvement comprising means supporting said door member in substantially a closed position in relationship to said opening, locking means mounted on a first of said members for movement between an unlocked position and a locked position engaging a second of said members for locking said members together, yielding means biasing said locking means toward one of said positions with said second member, control means selectively opposing said yielding means for selectively moving said locking means toward each of said positions and for maintaining said locking means in a normal position, and means responsive to an interfering force moving said locking means away from said normal position for stopping said control means.

16. Improved apparatus for combination with a pressure vessel member having an opening and a door member for closure of said opening, said improvement comprising means supporting said door member in substantially a closed position in relationship to said opening, locking means movably mounted on a first of said members and adapted to engage a second of said members for locking said members together, yielding means biasing said locking means toward a locked position with said second member, and control means selectively opposing said yielding means for selectively moving said locking means toward and away from said locked position and maintaining said locking means in a normal position, and means responsive to an interfering force moving said locking means out of said normal position in opposition to said yielding means for stopping said control means.

17. Improved apparatus for combination with a pressure vessel member having an opening and a door member for closure of said opening, said improvement comprising means supporting said door member in substantially a closed position in relationship to said opening, locking means movably mounted on a first of said members and adapted to engage a second of said members for locking said members together, yielding means biasing said locking means toward a locked position with said second member, and control means selectively opposing said yielding means for selectively moving said locking means toward and away from said locked position and maintaining said locking means in a normal position, and a motor in driving relationship with said control means, switch means in circuit with said motor responsive to said locking means being moved away from its normal position for opening said circuit.

18. Improved apparatus for combination with a pressure vessel member having an opening and a door member for closure of said opening, said improvement comprising means supporting said door member in substantially a closed position in relationship to said opening, locking means movably mounted on a first of said members and adapted to engage a second of said members for locking said members together, yielding means biasing said locking means toward a locked position with said second member, and control means selectively opposing said yielding means for selectively moving said locking means toward and away from said locked position and maintaining said locking means in a normal position, a motor in driving relationship with said control means, a circuit breaker in circuit with said motor, friction means intermediate said locking means and said first member creating sufficient friction when said locking means is moved out of its normal position in opposition to said yielding means to stall said motor and actuate said circuit breaker.

19. Improved aparatus for combination with a pressure vessel member having an opening and a door member for closure of said opening, said improvement comprising a yielding means biasing said door member toward an open or closed position with said opening and control means selectively opposing said yielding means for selectively moving said door member between said open and closed positions and for maintaining said door member in a normal position, said control means includes detent means responsive to force opposing said control means for disengaging said control means.

20. Improved apparatus for combination with a pressure vessel member having an opening and a door member for closure of said opening, said improvement comprising means supporting said door member in substantially a closed position relative to said opening, eccentric cam means rotatably mounted around the periphery of said door member on a first of said members, locking means intermediate said cam means and a second of said members, yielding means biasing said locking means toward an ajar position with said second member, first control means selectively opposing said yielding means for selectively moving said locking means between an unlocked position and an ajar position, second control means controlling the direction of rotation of said cam means to selectively move said locking means between said ajar position and a locked position, and a third control means intermediate said members at a first side for yieldingly moving said door member from an open position to a closed position and means interconnecting said first and third control means rendering said third control means effective to close said door before said locking means reaches said ajar position.

21. Improved apparatus for combination with a pressure vessel member having an opening and a door member for closure of said opening, said improvement comprising: a shaft rotatably mounted on a first of said members at a first side of said door member, locking means rotatably mounted on said shaft and being adapted for locking said members together, control means for moving said locking means between open and closed positions including a spring yieldingly biasing said locking means toward said closed position, cam means rigidly mounted on said shaft selectively permitting said spring to move said locking means between said open and ajar positions, and a lever pivoted on said first member responsive to said cam means for opposing said spring.

22. Improved apparatus for combination with a pressure vessel member having an opening and a door member for closure of said opening, said improvement comprising means supporting said door member in substantially a closed position in relationship to said opening, locking means mounted on a first of said members for movement between an unlocked position and a locked position engaging a second of said members for locking said members together, yielding means biasing said locking means toward one of said positions with said second member, and control means selectively opposing said yielding means for selectively moving said locking means toward each of said positions and for maintaining said locking means in a normal position, and a motor in driving relationship with said control means, switch means in circuit with said motor responsive to said locking means moving away from its normal position for opening said circuit.

References Cited in the file of this patent

UNITED STATES PATENTS

| 2,399,327 | Cullen | Apr. 30, 1946 |
| 2,882,115 | Linderschmidt | Apr. 14, 1959 |
| 3,006,379 | Hauk | Oct. 31, 1961 |

FOREIGN PATENTS

| 210,169 | Great Britain | Oct. 27, 1922 |
| 337,026 | Great Britain | Dec. 30, 1929 |
| 420,989 | Great Britain | June 29, 1933 |
| 518,888 | Great Britain | Sept. 6, 1938 |
| 620,193 | Great Britain | Jan. 7, 1947 |